Aug. 8, 1933.  W. J. ANDRES  1,921,146
BRAKE OPERATING CONNECTION
Original Filed Jan. 21, 1928
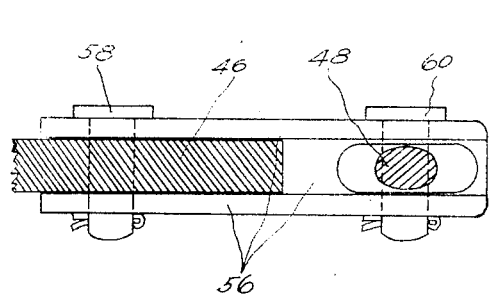
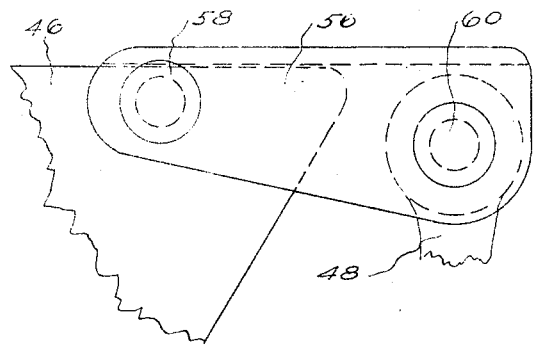
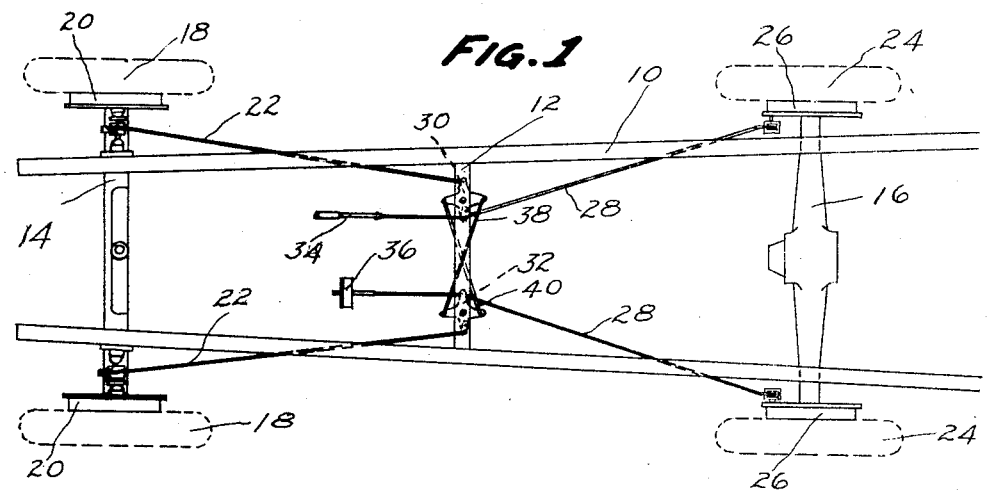
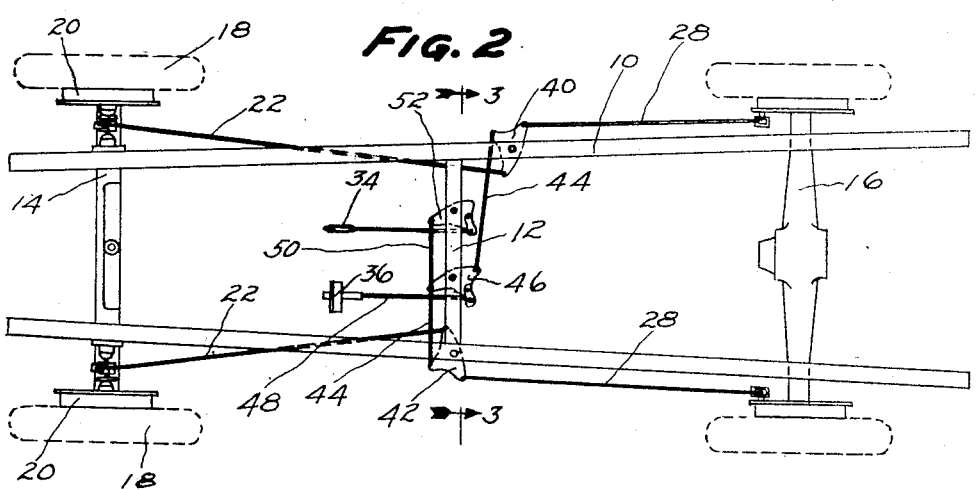
INVENTOR
WILLIAM J. ANDRES
BY
ATTORNEY Patented Aug. 8, 1933

1,921,146

UNITED STATES PATENT OFFICE 1,921,146

BRAKE-OPERATING CONNECTION

William J. Andres, South Bend, Ind., assignor to Bendix Brake Company, South Bend, Ind., a Corporation of Illinois Application January 21, 1928, Serial No. 248,509
Renewed July 18, 1932

16 Claims. (Cl. 188—10)

This invention relates to brakes, and is illustrated as embodied in an automobile chassis having novel operating connections for a set of four-wheel brakes. An object of the invention is to provide simple operating connections for the brakes without the use of shafts and their bearings, by using a system of interconnected levers, preferably all swinging in a horizontal plane.

An important feature relates to arranging the connections so that there is no one part in the system which can give way without leaving at least two effectively-operable brakes.

The above and other objects and features of the invention, including various novel specific combinations and various desirable structural details, will be apparent from the following description of two illustrative embodiments shown in the accompanying drawing, in which:

Figure 1 is a diagrammatic top plan view of a chassis showing one embodiment of the invention;

Figure 2 is a similar view showing a second embodiment of the invention;

Figure 3 is a partial section through one of the levers, on the line 3—3 of Figure 2, but on a larger scale than Figure 2; and Figure 4 is a top plan view of the parts shown in Figure 3.

In both arrangements, the chassis is illustrated as including a frame 10, which may have a cross member 12, and which is supported by the usual springs on a front axle 14 and a rear axle 16. The front axle is supported on road wheels 18 having brakes 20 operated by brake rods or cables 22, while the rear axle 16 is supported on road wheels 24 having brakes 26 operated by brake rods or cables 28.

In the arrangement of Figure 1, the brake connections 22 and 28 are operated by transverse arms of two four-arm horizontally-swinging bellcrank levers 30 and 32. One operating device, such as an emergency hand lever 34, is connected to the bellcrank lever 30, while the pedal 36 or other alternative operating member is connected to the other bellcrank lever 32, preferably by means of one-way connections such as the one shown in detail in Figures 3 and 4.

By the arrangement described above, depression of pedal 36 operates the two left brakes (front and rear), while operation of the emergency member 34 operates the two right brakes. In order that either the pedal 36 or the emergency member 34 may operate all four of the brakes, the bellcrank levers 30 and 32 may be connected by means such as two crossed tension elements 38 and 40, which may be rods or cables. It will be noted that when pedal 36 is depressed, the connection 38 operates the two right brakes, while when the emergency member 34 is operated the connection 40 operates the two left brakes.

It should be particularly noted that, in the above-described system as well as in the modification described below, there is no one part which can give way that will not leave at least two of the four brakes operatively connected.

In the embodiment of Figure 2, connections 22 and 28 are operated by two three-arm bellcrank levers 40 and 42, mounted to swing in a horizontal plane on the side members of frame 10. The two levers 40 and 42 are connected by tension elements 44 to oppositely-extending arms of a third three-arm bellcrank lever 46, which is also connected, by a novel one-way connection shown in Figures 3 and 4, to a tension element 48 extending rearwardly from pedal 36.

Lever 46 is further connected by a tension element 50 with a fourth bellcrank lever 52, which in turn is connected by a suitable tension element with the hand lever 34, the connection being through a one-way connection such as the one in Figures 3 and 4. The two levers 46 and 52 are preferably mounted to swing horizontally on the cross member 12 of the frame.

The one-way connection shown in Figures 3 and 4 includes a channel-section stamped steel operating part 56 having its back engaging the rear edge of lever 46 (or 52 or 38 or 40), and having its sides embracing the lever. Part 56 is connected at its inner end to lever 46 by means such as a pivot 58, and is connected at its outer end to the tension element 48 by means such as a pivot 60. Thus element 48 acts through part 56 to rock the lever 46, but lever 46 can move independently of element 48.

The one way connection shown in Figures 3 and 4 is described and claimed in my copending application 601,657 filed March 28, 1932.

While two illustrative embodiments have been described in detail, it is not my intention to limit the scope of the invention to those particular embodiments, or otherwise than by the terms of the appended claims.

I claim:

1. Operating connections for a plurality of brakes comprising, in combination, two horizontally-swinging bellcrank levers, an operating member connected to each lever, tension means connecting the two levers, and brake-operating connections operated by the levers.

2. Operating connections for a plurality of brakes comprising, in combination, two horizontally-swinging bellcrank levers, a foot pedal connected to one lever, an emergency hand lever connected to the other lever, tension means connecting the two bell-crank levers, and brake-operating connections operated by the bell-crank levers.

3. Brake-operating connections comprising, in combination, two connected horizontally-swinging levers, each connected to operate part of the brakes, a foot pedal, a hand lever, and tension connections operated by the foot pedal and the hand lever and arranged to operate the two horizontally-swinging levers.

4. Brake-operating connections comprising, in combination, two horizontally-swinging levers, each connected to operate part of the brakes, a foot pedal connected to one of the levers, a hand lever connected to the other of the levers, and a pair of crossed tension elements connecting the two levers.

5. Brake-operating connections comprising, in combination, horizontally-swinging levers having tension connections therebetween and connections to the brakes, a pedal connected to one of the levers, and an emergency brake-operating member connected to another of the levers.

6. A vehicle chassis having wheels with brakes and a frame supported by the wheels, in combination with a pair of generally horizontal levers fulcrumed on the frame and extending crosswise of the frame, connections from each of said levers to part of the brakes, a direct connection between the two levers, one operating lever connected to one of the horizontal levers and another operating lever connected to the other of the horizontal levers.

7. A vehicle chassis having wheels with brakes and a frame supported by the wheels, in combination with a pair of generally horizontal levers fulcrumed on the frame intermediate their ends and extending cross-wise of the frame, connections from each of said levers to part of the brakes, said connections extending from opposite sides of the fulcrum of each lever, a direct connection between the two levers and an operating lever connected to one of the horizontal levers and acting, through the connection, on the other of the horizontal levers.

8. An automotive vehicle having a chassis, front and rear wheels supporting said chassis, a foot pedal, a hand actuating member, a pair of rotatable levers pivotally mounted on said chassis and spaced laterally and aligned laterally, and connections from said foot pedal and said hand actuating member to said levers.

9. An automotive vehicle having a chassis, front and rear wheels supporting said chassis, a foot pedal, a hand operated member, a pair of rotatable levers pivotally mounted on said chassis, a connection from one said lever to said hand member, a connection from the other lever to said foot pedal, a connection from one end of one lever to one front brake, a connection from the other end of said lever to a rear brake, a connection from one end of the other said lever to the other rear brake, a connection from the other end of the last named lever to the other front brake, and means for connecting said levers.

10. An automotive vehicle having a chassis, front and rear wheels supporting said chassis, a foot pedal, a hand operated member, a pair of laterally spaced rotatable levers pivotally mounted on said chassis, a connection from one said lever to said hand member, a connection from the other lever to the foot pedal, a connection from one end of one lever to a front brake, a connection from the other end of said lever to a rear brake, a connection from the one end of the other said lever to the other rear brake, a connection from the other end of the last named levers to the other front brake and means for connecting said levers.

11. An automotive vehicle having a chassis, front and rear wheels supporting said chassis, an actuating member, a pair of rotatable levers pivotally mounted on said chassis and spaced laterally, a connection from one end of one lever to a front brake, a connection from the other end of said lever to a rear brake, a connection from one of said ends of said lever to said actuating member, a connection from one end of the other said lever to the other front brake, a connection from the other end of said last named lever to the other rear brake, and means for connecting said levers.

12. A vehicle chassis having wheels with brakes and a frame supported by the wheels, in combination with a pair of generally horizontal levers fulcrumed on the frame and extending crosswise of the frame, connections from each of said levers to a plurality of said brakes, a direct connection between the two levers, and an operating lever connected to one of the horizontal levers and acting through the connection on the other of the horizontal levers.

13. A vehicle chassis having wheels with brakes and a frame supported by the wheels, in combination with a pair of generally horizontal levers fulcrumed on the frame and extending crosswise of the frame, connections from each of said levers to a plurality of said brakes, said connections extending from opposite sides of the frame, a direct connection between the two levers, and operating means for rocking the levers to apply the brakes.

14. An automotive vehicle having a chassis frame, front and rear wheels supporting said chassis frame, a foot pedal, a hand actuating member, a pair of rotatable levers, means for supporting said levers pivotally on said chassis frame so that the levers are spaced laterally and substantially aligned laterally, brakes for said front and rear wheels, connections between each of said levers and one of said rear brakes, connections between each of said levers and one of said front brakes, and actuating connections separate from said supporting means including connections between said levers and said foot pedal and connections between said hand actuating member and said levers.

15. An automotive vehicle having a chassis frame, wheels supporting said frame, brakes for said wheels, a pair of levers, means for supporting said levers pivotally upon said frame, means connected to the levers at points spaced from the pivots thereof for connecting the levers, connections between the levers and the brakes for operating the brakes, a hand actuating member, means connected to the hand actuating member for rotating the levers, a foot pedal, and means connected to the foot pedal for rotating the levers.

16. An automotive vehicle having a chassis, front and rear wheels supporting said chassis, brakes on said wheels, a pair of double ended levers, means for securing said levers pivotally on said chassis, means separate from said securing means for connecting said levers, a pedal connections from said pedal effective to move said levers and connecting means, a hand actuating member, connections from said hand actuating member effective to move said levers and connecting means, and means connecting said levers and said brakes whereby movement of said levers about the pivots operates said brakes.

WILLIAM J. ANDRES.